United States Patent [19]

Sanderford, Jr.

[11] Patent Number: 5,311,541

[45] Date of Patent: May 10, 1994

[54] FREQUENCY AGILE RADIO

[75] Inventor: H. Britton Sanderford, Jr., New Orleans, La.

[73] Assignee: Axonn Corporation, New Orleans, La.

[21] Appl. No.: 880,268

[22] Filed: May 8, 1992

[51] Int. Cl.5 .............. H04B 15/00; H04L 27/26; G01S 7/36
[52] U.S. Cl. ................................. 375/1; 380/34; 380/48; 342/18
[58] Field of Search .............. 342/13, 18; 380/34, 380/48; 375/1

[56] References Cited

U.S. PATENT DOCUMENTS

| | | | |
|---|---|---|---|
| 4,334,322 | 6/1982 | Clark, III | 455/62 |
| 4,558,453 | 12/1985 | Mimken | 375/1 |
| 4,606,041 | 8/1986 | Kadin | 375/1 |
| 4,628,270 | 12/1986 | Roberts | 329/50 |
| 4,704,585 | 11/1987 | Lind | 331/14 |
| 4,752,939 | 6/1988 | Amoroso et al. | 375/1 |
| 4,761,796 | 8/1988 | Dunn et al. | 375/1 |
| 4,773,085 | 9/1988 | Cordell | 375/120 |
| 4,799,062 | 1/1989 | Sanderford, Jr. et al. | 342/450 |
| 4,872,182 | 10/1989 | McRae et al. | 375/1 |
| 4,977,577 | 12/1990 | Arthur et al. | 375/1 |
| 5,005,169 | 4/1991 | Bronder et al. | 370/76 |

OTHER PUBLICATIONS

M. K. Siman, J. K. Omura, R. A. Scholtz & B. K. Levitt, "Spread Spectrum Communications," vol. 3, pp. 208–279 & pp. 346–407, Rockville, Maryland: Computer Science Press, 1985.

Primary Examiner—Gilberto Barron, Jr.
Attorney, Agent, or Firm—David Neuman & Associates

[57] ABSTRACT

A frequency agile spread spectrum radio system which is capable of efficient frequency re-use and frequency sharing. The receiver adaptively learns which frequencies to avoid. The transmitter sends redundant transmissions on widely separated pseudo-random carrier frequencies to overcome jammed channels. A coded preamble is used to provide a greatly enhanced hybrid form of Time Division Multiple Access/Frequency Division Multiple Access for co-existence and frequency re-use with nearby systems. Anti-jam margins of 60 to 90 dB can be inexpensively achieved, far exceeding that of traditional direct sequence systems.

18 Claims, 4 Drawing Sheets

FREQUENCY AGILE RADIO

BACKGROUND OF THE INVENTION

This invention relates to robust methods of frequency re-use and frequency sharing which prevent independent radio systems from co-interference due to frequency crowding of available radio bands, and, more particularly, this invention relates to a method of frequency agility which can provide a low cost solution to many burst mode and continuous data communications applications, including security systems, fire systems, access control, energy management, remote control of model planes, remote process control, traffic light control, remote power meter reading, voice communication, radio location, or local area networks.

DESCRIPTION OF THE RELEVANT ART

The use of spread spectrum communications and techniques for diverse commercial and civilian applications has increased in recent years. By utilizing such techniques to minimize mutual interference and to provide anti-jamming advantages to multiple-access communications, as well as aiding in extremely accurate position location using satellites in synchronous and asynchronous orbits, spread spectrum techniques are known to offer the advantage of improved reliability of transmission in frequency-selective fading and multipath environments.

U.S. Pat. No. 4,799,062 to Sanderford, Jr. et al. teaches that multipath in urban areas poses a problem for accurate position location, which may be overcome by using a method of synchronization of transmissions and unique identification codes to derive relative ranging times for determining position. Compensation for multipath may include spread spectrum techniques.

U S. Pat. No. 4,977,577 to Arthur et al. has a wireless alarm system using spread spectrum transmitters and fast frequency shift keying for achieving a coarse lock and a fine lock to the spread spectrum signal. By using spread spectrum techniques, such wireless alarm systems are highly reliable and provide a safety margin against jamming and undesirable interference. Other applications of spread spectrum techniques to commercial uses promise similar advantages in reliability in communications.

Methods for the serial search and acquisition of utilized spread spectrum frequencies are well known in the prior art, as shown in M. K. Simon et al., *Spread Spectrum Communications*. vol. 3, pp. 208–279, Rockville, Md.: Computer Science Press, 1985. In addition, M. K. Simon et al., supra. at pp. 346–407 teach spread spectrum multiple access techniques such as utilizing ALOHA random access schemes.

OBJECTS OF THE INVENTION

A general object of the invention is to achieve superior jamming resistance compared to other spread spectrum means.

Another object of the invention is to allow multiple systems to co-exist without undesirable co-interference.

Another object of the invention is to minimize the effects of data collisions when a system supports numerous non-synchronized ALOHA protocol transmitters.

An additional object of the invention is to operate within the radio band allowed by the FCC with minimal cost and minimal frequency setting components.

A further object of the invention is to provide techniques suitable for a high level of monolithic circuit integration.

SUMMARY OF THE INVENTION

According to the present invention, as embodied and broadly described herein, a frequency agile method is provided which has a low cost solution to many burst mode and continuous data communications applications, including security systems, fire systems, access control, energy management, remote control of model planes, remote process control, traffic light control, remote power meter reading, voice communication, radio location, or local area networks.

In remote monitoring applications, the frequency agile radio system typically includes one or more centrally located data collection receivers with one or more remotely located transmitters. In control applications, one or more centrally located transmitters may communicate with a plurality of remotely located receivers. Further, the system can provide two-way polled type communications where each data node requires both a receiver and a transmitter.

The method for providing frequency agility includes using a frequency-agile transmitter and a frequency-agile radio system for sending a message-data signal by selecting a single pseudo-random frequency on which to transmit, by generating a preamble signal on a single carrier frequency for modulating message data, by transmitting the preamble signal for a pre-set preamble time for allowing an appropriate frequency-agile receiver to lock-on the preamble signal, and by modulating the preamble signal with the message data signal to produce a modulated signal. The message-data signal is defined herein to be a signal having message-data.

In addition, the method for providing frequency agility includes using a frequency-agile receiver in the frequency-agile radio system for avoiding occupied radio-frequency channels in a radio spectrum by scanning the radio spectrum, identifying occupied portions of the radio spectrum, updating information identifying the occupied portions, storing the updated information in memory means, associating a time-out period with the stored occupied portions, and skipping over the occupied portions of the radio spectrum during the time-out period in response to the information and while receiving with the frequency-agile receiver, so that only a single time counter is required for all radio bands.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
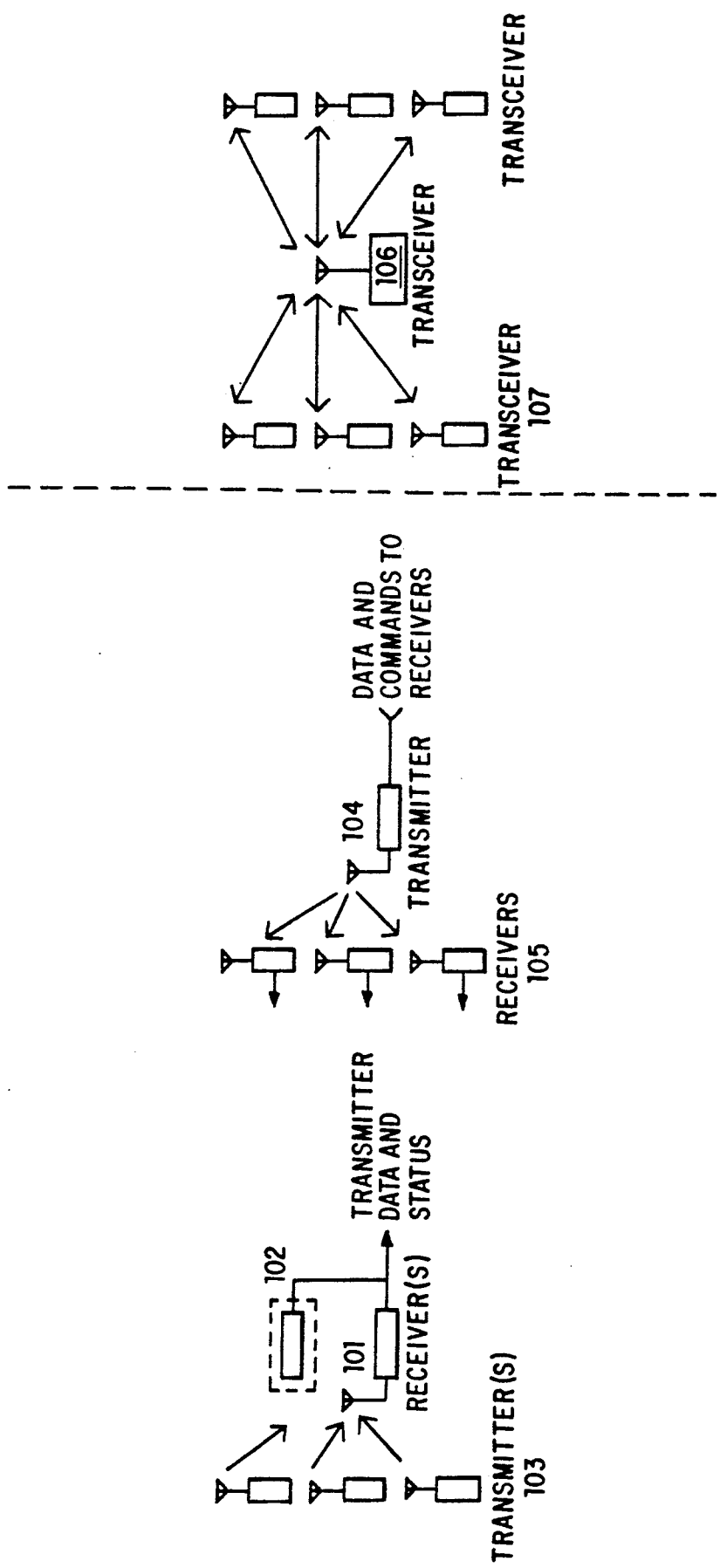
FIGS. 1A–1C shows a configuration for a frequency agile transmitter/receiver system.

Reference will now be made in detail to the present preferred embodiments of the invention, examples of which are illustrated in the accompanying drawings, wherein like reference numerals indicate like elements throughout the several views.

In the exemplary arrangement shown in FIG. 1, the frequency-agile transmitter is designed to send one full message-data signal on one single carrier frequency, with the carrier frequency pseudo-randomly selected. To avoid loss of data throughput, in case the selected frequency is jammed, the frequency-agile transmitter, after delaying for a pseudo-random time interval, selects a new pseudo-random frequency as a next frequency, which is widely separated from the previous frequency, and re transmits the entire message-data signal on that frequency- The number of redundant re-transmissions and a preselected average time interval between re-transmissions is programmable, which allows optimization to a particular installation. For example, if the number of transmissions required to overcome other sources of data loss, such as ALOHA collisions, bit error rate, impulse noise, etc., were 5, then by doubling the redundant transmissions to 10 would allow continued system operation if as much as ½ of the available radio band were jammed.

That is an extreme example, but consider in that example the time overhead, two to one, compared to the bandwidth overhead, ten to one or 200 to one, required by conventional spread spectrum techniques which use all of available radio spectrum simultaneously. The present invention is much more frequency efficient for equivalent anti-jam performance. Further, the extra time required to re-transmit with even 100% redundancy can be overcome by doubling the data rate which causes only a 3 dB penalty in receiver sensitivity.

The compensating advantage is large for anti-jamming and frequency re-use. For example, consider two adjacent but independent frequency-agile radio systems, a first system A and a second system B, each with single frequency-agile receiver and multiple transmitters. In a direct sequence system or a fast frequency hopper, each bit of a message-data signal is represented on every available frequency. For example, if a transmitter of the first system A were ON, and were set to use 63 frequencies, then the data messages signals received by the second system B are subjected to the multiple access suppression available, which is 18 dB or less. The frequency-agile radio system of the present invention responds differently. If a transmitter of the first system A were ON, and were set to use 63 hopping channels, then a data message signal received by the second system B intended for second system B's own transmitter(s) has only a 1 in 63 temporal chance for being interfered. Since the receiver is actually occupying only one frequency at a time, a very small increase to data message signal re-transmissions overcomes the 1 in 63 failure rate due to collisions from the first system A.

An additional method is used to enhance resistance to wide bandwidth jamming and to selective radio channel fading. A hop list or hop algorithm is designed to provide a minimum hop distance of 500 kHz or more per frequency step, so that, if the coherence bandwidth of the radio channel is 2 MHz, then several steps overcome the fade.

Each data transmission is proceeded by a pre-determined carrier preamble signal with a pre-set preamble period which provides the time needed by the receiver to sweep the entire radio spectrum available for the system to use and to lock-on to the preamble signal. Such a sweep can take from one to three milliseconds, depending on system parameters. Additionally, the preamble signal can be modulated with a repetitive data code, called a PREAMBLE SYSTEM CODE, that identifies the transmitter as belonging to a particular system, so that, if an associated receiver locks on an energy source as the receiver sweeps, the receiver can rapidly demodulate the PREAMBLE SYSTEM CODE to determine if the energy source or data packet were intended for that receiver. If not, the receiver can continue to sweep its available spectrum to search for valid incoming messages. The goal is to minimize the dwell time on any piece of impulse noise, jammer, or data packets which are intended for an unrelated system receiver.

Prior to system operation the frequency-agile receiver performs a sweep of the radio spectrum available for system operation. The receiver logs all channels with higher than expected received energy levels. Either signal strength or a quieting detector or a phased-locked-loop "lock detect" circuit or the like is capable of supplying that information. Each usable frequency channel is associated with its own unique position in a memory device. The status of that channel is also associated with that memory location. The status information includes: 1) if the channel is "clear" or "jammed"; and 2) how many time counts must elapse prior to re-sampling to determine if that channel has become "clear". The jammed/clear indication can also be equipped with an additional associated counter such that more than one occurrence of channel jamming is required to set the JAMMED flag. That feature makes the system more robust against impulse noise. Further, the receiver does not consider a PREAMBLE SYSTEM CODE of an unrelated system to be JAMMING. Such occasional receptions are expected and quickly discarded prior to message "data" demodulation. Sufficient extra time is built into the preamble signal to allow for several collisions with unrelated PREAMBLE SYSTEM CODES, and for successful decode of a data message signal.

Upon initial set-up, the receiver determines the frequencies to avoid and a table containing information of such frequencies is stored in the receiver's memory. The table is then transferred via electrical means to the other associated transmitters or transceivers. The receiver can determine which PREAMBLE SYSTEM CODES are unused and available during power-up and initialization. The receiver can transfer the information on unused and available PREAMBLE SYSTEM CODES as a list of frequencies on which to transmit to other system transmitters as well. Such information transference can be magnetic, electrical, optical, acoustic, or via a display and entered through a keypad connected to the transmitter. Once the list is so loaded, the transmitter will not transmit on the frequencies marked as 'jammed' and will use only the PREAMBLE SYSTEM CODE assigned.

The PREAMBLE SYSTEM CODE can be data modulated via any appropriate means including frequency-shift-keying (FSK), binary-phase-shift-keying (BPSK), or amplitude-shift-keying (ASK) modulation. ASK modulation is less desirable, however, because ASK modulation requires time spent without full carrier presence.

One separate method to accomplish co-existence with adjacent systems requires that both the frequency-agile transmitter and the frequency-agile receiver be highly frequency stable. Such stability must be greater than the sum of transmitter and receiver frequency uncertainty, frequency drift, and data bandwidth. For example, the frequency-agile transmitter can transmit on any one of 50 frequencies, each separated by 500 kHz. If the required data bandwidth were 25 kHz, then 10-20 separate channels could fit in each 500 kHz hop slot. Therefore, 10-20 co-located systems could co-exist with no co-interference, and TDMA would not be needed. To attain frequency stabilization, the frequency-agile transmitter and frequency-agile receiver would simply offset their normal hop by a pre-determined number of 25 kHz slots. Each system could determine which slot is unused and then assign each unused slot to all associated system elements. This method of transmitting on any one of 50 frequencies does not work, however, if the accuracy or drift of the carrier frequency were greater than +13.5 kHz. At 915 MHz, the drift equals 15 ppm. Absent such accuracy, adjacent channels may cause interference. Therefore, the offsetting of the carrier frequency of each frequency-agile transmitter by at least the required data bandwidth plus compensation for frequency inaccuracies allows multiple systems to co-exist, which utilize this technique.

Previous attempts in the prior art to integrate voltage-controlled-oscillator (VCO) components with divider and phase comparison analog and digital circuits have failed, since the phase noise generated by the digital divider was induced into the VCO and phase comparator, but such phase noise ultimately reduces the sensitivity of the receiver. The preferred embodiment runs the digital divider for a brief period prior to transmission. The divided down signal is then used to produce a constant frequency error offset term to the VCO. The digital divider is then disabled after the frequency error offset is measured so that the VCO can run open-loop without being subjected to phase noise of the divider harmonics. The receiver is able to compensate for any short term frequency drift during transmission.

FIG. 1A depicts a frequency-agile receiver 101 which can be used to accept transmissions from a plurality of frequency-agile transmitters 103. The frequency-agile transmitters are non-synchronized and must depend on ALOHA type communicating redundancy to ensure data receptions. Additional optional frequency-agile receivers 102 may be included to expand system coverage or add spacial diversity to reduce fading.

FIG. 1B depicts a frequency-agile transmitter 104 sending message-data signals or command signals to a plurality of frequency-agile receivers 105. Each frequency-agile receiver is equipped with a unique address by which to accept commands and data intended for that unit. Once again, transmitter data redundancy is required to ensure reliability.

FIG. 1C depicts a system whereby a frequency-agile transceiver 106 may be linked to a single remote transceiver or by a plurality of remote transceivers 107. In such a system, each system element is associated with a unique address or identification number.

Any number of appropriate two way communications protocols may be utilized on such a system including poll-response, reservation request, report by exception, etc.

Figures 2A, 2B:
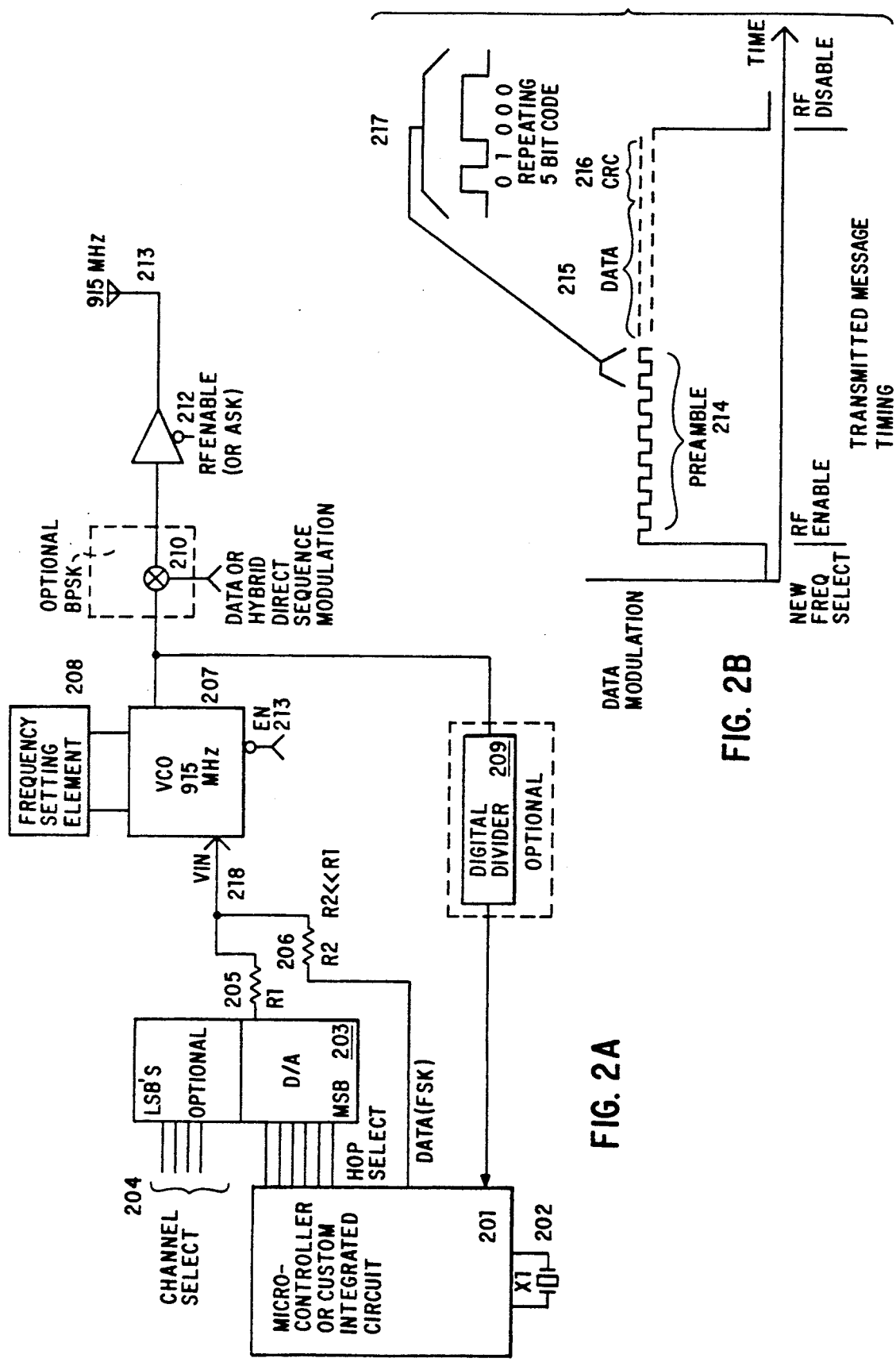
FIG. 2 is a block diagram of a frequency agile transmitter.

As illustratively shown in FIG. 2, processor means, which may be embodied as a microprocessor or custom digital integrated circuit, is used to generate all transmitter timing. In order to initiate a transmission, the microprocessor 201 first selects the pseudo-random frequency to be used, either by table look-up or by an algorithm. Once chosen, the microprocessor 201 selects the appropriate digital-to-analog hop setting and outputs the hop setting to the digital-to-analog 203. The digital-to-analog converter 203 in turn sets a new voltage level onto the voltage input 218 of the voltage control oscillator (VCO) 207. The microprocessor 201 then enables 213 the VCO 207. The VCO 207 then begins to oscillate at the frequency selected by the voltage control input and the frequency setting resonant element 208. The frequency setting element can be any appropriate resonant or phase delay device(s). The quality factor Q and temperature stability of the resonant element must be great enough to prevent drift outside of allowed FCC bands. The maximum drift and frequency uncertainty must be determined. Then a "guard band" for larger than the maximum uncertainty must be provided on both sides of the intended transmitted bandwidth so that inaccuracies in the frequency setting elements do not cause transmissions in disallowed frequency bands.

If the frequency setting element 208 were not stable enough to meet these FCC requirements with a reasonably small "guard band", then an optional divider 209 can be used to lower the carrier frequency to rates which can be digitally inputted and counted by the microprocessor 201 to determine the frequency of VCO operation. The microprocessor 201 can then generate a frequency error offsetting term to the digital-to-analog converter 203 to generate an offsetting voltage. A voltage input of the VCO 207 receives the offsetting voltage so that the VCO 207 is then adjusted by the offsetting voltage to within a required tolerance range. This method has the advantage of not having to run closed-loop, nor be highly accurate, since this method only needs to achieve the "guard band" requirements so that inaccuracies in the frequency setting elements do not cause transmissions in disallowed frequency bands. Further, if the VCO 207 drifts during the brief message, then the receiver can track and compensate for the drift after the receiver initially attains a lock on a transmitter.

Once on frequency, the microprocessor 201 enables subsequent or final radio frequency amplifiers, embodied as the radio frequency (RF) output 212, which in turn generates a signal on the antenna 213. The microprocessor 201 then modulates the carrier frequency with the PREAMBLE SYSTEM CODE, which can be a repetitive five bit code which contains part of the transmitter's unique larger system code. The modulation of data can be FSK via resistor R2 206 or BPSK 210 or ASK 212, or any other appropriate modulation means.

The transmitted preamble 214 is sufficiently long enough for the receiver to a) search the entire radio band available, b) lock on the transmitter carrier, and c) validate the PREAMBLE SYSTEM CODE 217. Further, preamble time is provided so that unrelated PREAMBLE SYSTEM CODES or impulse noise can be analyzed and rejected with enough time reserved to recognize and intended PREAMBLE SYSTEM CODE. Once the preamble is complete, the transmitter then sends its message-data signal 215 via one of the above data modulation means. The message-data signal is then followed by a cyclic-redundancy-check (CRC) 216 error correction/detection code to ensure data integrity by detecting and correcting error bits appended to the message-data.

If the frequency setting process were highly stable, then the four least-significant bits of the digital-to-analog converter 204 can be used for channel selection, providing for system co-existence on a non-interfering basis. These adjacent channels can be thought of as the last three or four significant bits of the digital-to-analog input to the VCO 207. The most-significant-bits are controlled by a pseudo-random "hop frequency" generator. The least-significant bits stay fixed and cause a permanent but small frequency offset in the VCO 207. Providing both the receiver and transmitter use the same offset, the two are able to communicate. A system with a different offset is suppressed by the frequency selectivity of the receiver and ignored.

This hopping technique can be readily made hybrid by additionally modulating the VCO 207 carrier with other direct sequence methods.

Figure 3:
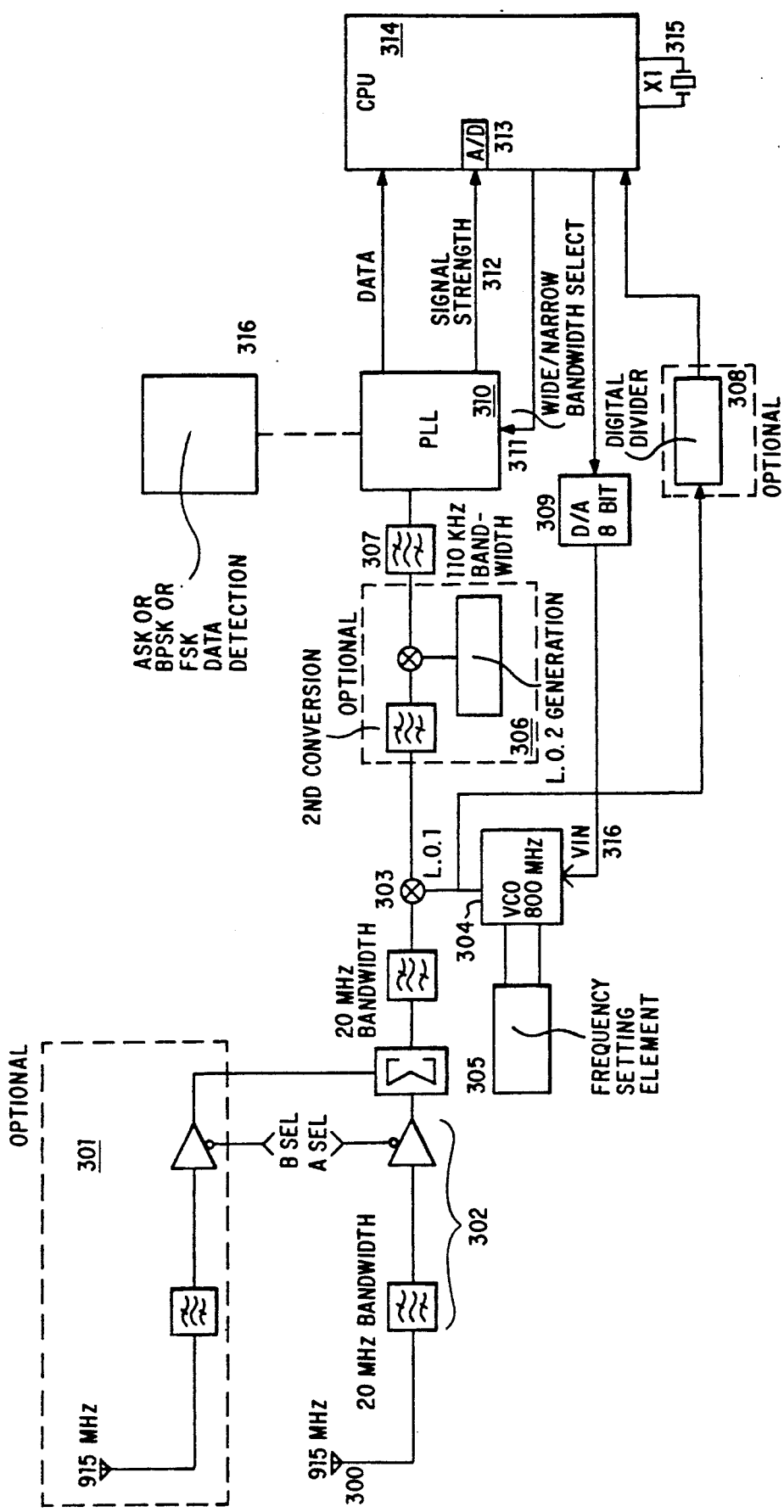
FIG. 3 is a block diagram of a frequency agile receiver.

Referring to FIG. 3, a 915 MHz modulated carrier is introduced into antenna port 300 then filtered and amplified by section 302. If spatial diversity is desired, an optional section 301 can be added and controlled by generally known means to lower occurrences of selective fading.

Mixer 303 receives a local oscillator signal which is generated by a voltage controlled oscillator (VCO) 304. The frequency of the VCO 304 is set by a frequency setting element 305 and by the voltage preset on the voltage control input, VIN 315. The voltage control input VIN 316 voltage is generated by a digital-to-analog converter 309 or by any other appropriate linear means which can produce a controllable voltage ramp.

If the frequency setting element 305 has a poor absolute accuracy, or time, or temperature drift, an optional divider 308 can be used for correcting frequency error. The divided down result is compared to the crystal 315 of the microprocessor 314 which then produces a frequency error offsetting voltage via the digital-to-analog circuit 309.

The down converted output of the mixer 303 can be immediately demodulated or passed first through an optional second conversion state 306.

In the preferred embodiment, prior to data demodulation, the signal is first band-limited by a fixed frequency and bandwidth filter 307. The signal is then decoded by the data demodulator. The demodulator means 316 or 310 must match the transmitter's data modulation utilized.

In the preferred embodiment, a phase lock-loop (PLL) 310 is used to detect FSK modulated data. The available frequency spectrum is initially swept through and monitored via a wider PLL loop intermediate frequency bandwidth selected by wide/narrow bandwidth select 311, so that the entire available bandwidth can more quickly swept through. The energy detector, carrier lock-detect, quieting detector or equivalent means must have a very rapid response time, which should exceed the impulse response time of the filter 307 that is, 1/110 kHz=9 microseconds, in this example.

Once the carrier is initially detected, a more narrow bandwidth can be selected by 311 which is more representative of the data bandwidth required for the elected data rate. This narrowing of the bandwidth improves the carrier to noise ratio. The microprocessor 314 or other linear means then can be used to close the frequency control loop and track and compensate for further transmitter or receiver drift components.

If the drift components are minimal, and the transmitted message brief, a frequency control loop will not be needed. At this point, data can be demodulated. Alternatively, if the PREAMBLE SYSTEM CODE does not match, noise and interference in occupied portions of the radio spectrum can be identified and skipped over while the transmitter transmits.

If the transmitter is hybrid modulated with other spread spectrum modulation, such as direct sequence, then direct sequence demodulation must also be added after the hopping frequency is locked on. This would be an opportunity to include in the combination a simple parallel correlator means to decode data. Such a combination would be well suited to time-of-flight radio location applications. The hop sequence would be optimized for anti-jam and the parallel correlator optimized to "time stamp" the incoming message.

Figure 4C:
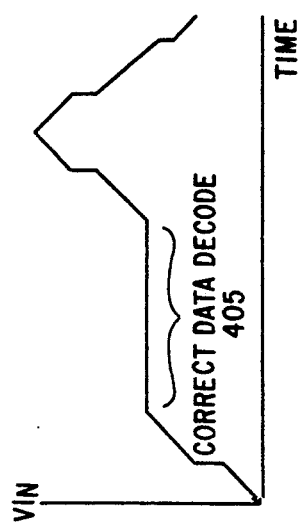
FIGS. 4A-4C shows the frequency sweep over the available spectrum by a receiver to identify noise, interference or data.
Figure 4B:
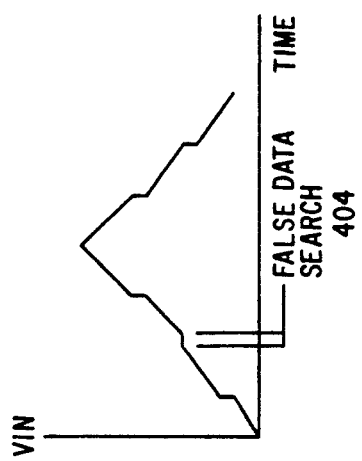
Figure 4A:
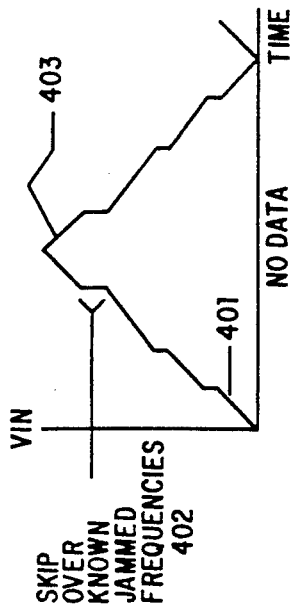

FIGS. 4A-4C illustratively shows the frequency sweep operation of the present invention. In normal operation, the receiver sweeps over the available spectrum to identify cases of noise, interference or data, and to store such identified portions of the spectrum in a jammed channel list. When no data and no new interference since the last memory update of the jammed channel list is detected during an associated time-out period and after a plurality of failed attempts to detect new data or interference have occurred, the VIN 316 input appears as depicted by FIG. 4A. The VIN will linearly sweep 401 until the microprocessor 314 determines, via the microprocessor's list stored in memory, a frequency to skip over 402 while the receiver is receiving. Once the maximum frequency point is reached, the VIN 315 input reverses the direction of sweep 403, in order to minimize the required impulse response of the VCO 304.

If new impulse noise or jamming were detected 404, such noise or jamming causes the CPU's 314 algorithm to temporarily stay on that frequency. The algorithm then attempts to decode a 5 bit PREAMBLE SYSTEM CODE. If that were not possible, then the VIN 316 sweep resumes its normal path. The PREAMBLE SYSTEM CODE can also be Grey coded or Manchester encoded so that impulse noise could be more rapidly detected as an illegal sub-sequence without having to monitor all 5 bits.

If the PREAMBLE SYSTEM CODE 217 matches, then the VIN stays constant 405 or in-track with a drifting input frequency 300 if a frequency locked loop (FLL) is used, so that transmitter and receiver frequency drift is compensated. The processor 314 then attempts to decode a data message 215 and CRC 216. After completion of the message decode, the normal search algorithm resumes and the previous path of VIN 316 continues.

It will be apparent to those skilled in the art that various modifications can be made to the frequency agile spread spectrum system of the instant invention without departing from the scope or spirit of the invention, and it is intended that the present invention cover modifications and variations of the frequency agile spread spectrum system provided they come within the scope the appended claims and their equivalents.

I claim:

1. A method, using a frequency-agile transmitter in a frequency-agile radio system, for sending message-data, the message-data including at least one of message signals, voice signals, and data signals, the method comprising the steps of:

selecting, pseudo-randomly, a single carrier frequency for use by said frequency-agile transmitter;

generating a preamble-data signal on the single carrier frequency;

transmitting the preamble-data signal for a pre-set preamble time for allowing an appropriate frequency-agile receiver to lock-on the preamble-data signal; and modulating a carrier signal having the single carrier frequency with the message-data to produce a modulated signal.

2. The method as set forth in claim 1 further including the steps of:

loading the frequency-agile transmitter with a list of occupied portions of the radio spectrum; and hopping, in response to the list of the occupied portions of the radio spectrum, one data message at a time, through a pseudo-random sequence of carrier frequencies with the pseudo-random sequence of carrier frequencies not having a carrier frequency in the occupied portions of the radio spectrum.

3. The method as set forth in claim 1 further including the step of loading the frequency-agile transmitter with a pseudo-random sequence of carrier frequencies on which to transmit, with the pseudo-random sequence of carrier frequencies avoiding the occupied portions of the radio spectrum.

4. The method as set forth in claim 1, further including the steps of:

modulating the preamble-data signal with a data code, the data code including a short identifying code;

repetitively sending the short identifying code on the single carrier frequency;

demodulating a portion of the data code by an associated frequency-agile receiver;

determining whether the portion of the data code is intended for the associated frequency-agile receiver; and discarding data codes which do not match a data coded intended for the associated frequency-agile receiver to reduce a dwell time on the carrier frequency.

5. The method as set forth in claim 1, further including the step of error detecting bits appended to the message-data.

6. The method as set forth in claim 1, further including the step of correcting error bits appended to the message-data.

7. The method as set forth in claim 1, further including the steps of:

transmitting the modulated signal; and retransmitting, after a preselected time interval, the modulated signal on a pseudo-randomly selected next carrier frequency in order to achieve data collision resistance and radio frequency jamming avoidance.

8. The method as set forth in claim 4, further including the steps of:

transmitting the modulated signal; and retransmitting, after a preselected time interval, the modulated signal on a pseudo-randomly selected next carrier frequency to achieve data collision resistance and frequency jamming avoidance.

9. The method as set forth in claim 1, further including the steps of:

transmitting the modulated signal; and generating, using a pseudo-random frequency selection algorithm, a plurality of frequency steps, with one frequency step per message, of at least 300 kHz for avoiding wide-band interference and for improving frequency diversity.

10. The method as set forth in claim 1, wherein the step of generating the preamble data signal includes using an open-loop voltage controlled oscillator.

11. A method, using a frequency-agile transmitter having a voltage controlled oscillator which is digitally stabilized, comprising the steps of:

enabling the voltage controlled oscillator;

dividing, digitally, the frequency of the voltage controlled oscillator and inputting to a microprocessor the resulting divided frequency;

determining the frequency, using a microprocessor, of the voltage controlled oscillator;

determining a frequency error term, using the microprocessor;

generating, using the frequency error term, an offsetting voltage to a voltage input of the voltage controlled oscillator to provide a gross frequency correction to prevent drift into other bands;

receiving the offsetting voltage;

adjusting the voltage controlled oscillator, using the offsetting voltage, to within a required tolerance range; and enabling subsequent radio frequency amplifiers preceding an antenna.

12. The method as set forth in claim 1 wherein the step of generating the preamble-data signal includes;

enabling a voltage controlled oscillator;

dividing, digitally, a frequency of the voltage controlled oscillator and inputting to a microprocessor the resulting divided frequency;

determining the frequency, using a microprocessor, of the voltage controlled oscillator;

determining a frequency error term, using the microprocessor;

generating, using the frequency error term, an offsetting voltage to a voltage input of the voltage controlled oscillator;

receiving the offsetting voltage;

adjusting the voltage controlled oscillator, using the offsetting voltage, to within a required tolerance range; and enabling subsequent radio frequency amplifiers preceding an antenna.

13. The method as set forth in claim 1, further including the steps of:

assigning transmitters associated with receivers to a unique fixed offset frequency from a nominal frequency-hopped carrier frequency;

choosing an offset frequency of at least a required data bandwidth plus frequency inaccuracies; and selecting the receiver bandwidth to reject transmitters on different offset frequencies, thereby achieving efficient co-channel usage on a frequency-hopping system.

14. The method as set forth in claim 1, further including the step of establishing guardbands so that inaccuracies in the frequency setting elements do not cause transmissions in disallowed frequency bands.

15. The method as set forth in claim 1, 2, 4, or 12, further including the step of direct sequence spread spectrum processing the modulated signal, thereby producing a hybrid system.

16. The method as set forth in claim 11, further including the step of tracking and correcting, with an associated frequency-agile receiver, frequency drift of the frequency-agile transmitter after the frequency-agile receiver initially is locked on the frequency-agile transmitter.

17. The method as set forth in claim 11, further including the step of frequency stabilizing a frequency-agile receiver.

18. The method as set forth in claim 11, further including the steps of:
   disabling the divider after the frequency error measurement has been made in order to reduce phase noise generated from the divider harmonics;
   adjusting a frequency error of the voltage control oscillator with a constant correction term, the constant correction term being constant for one message transmission; and
   enabling a final amplifier to initiate a transmission from a frequency-agile transmitter.

* * * * *